(12) United States Patent
Whitaker et al.

(10) Patent No.: US 12,287,062 B2
(45) Date of Patent: Apr. 29, 2025

(54) WALL OR CEILING ACCESS POINT

(71) Applicants: Joseph Whitaker, Las Vegas, NV (US); Michael Hopkins, Las Vegas, NV (US)

(72) Inventors: Joseph Whitaker, Las Vegas, NV (US); Michael Hopkins, Las Vegas, NV (US)

(73) Assignee: Origin Acoustics, LLC, Las Vegas, NV (US)

( * ) Notice: Subject to any disclaimer, the term of this patent is extended or adjusted under 35 U.S.C. 154(b) by 28 days.

(21) Appl. No.: 18/377,764

(22) Filed: Oct. 6, 2023

(65) Prior Publication Data

US 2024/0117927 A1    Apr. 11, 2024

Related U.S. Application Data

(60) Provisional application No. 63/414,208, filed on Oct. 7, 2022.

(51) Int. Cl.
| | |
|---|---|
| *F16M 13/02* | (2006.01) |
| *E04B 9/00* | (2006.01) |
| *F21S 8/02* | (2006.01) |
| *F21V 21/04* | (2006.01) |
| *H02G 3/12* | (2006.01) |

(52) U.S. Cl.
CPC ........... *F16M 13/027* (2013.01); *E04B 9/003* (2013.01); *F16M 2200/024* (2013.01); *F21S 8/02* (2013.01); *F21V 21/04* (2013.01); *H02G 3/123* (2013.01)

(58) Field of Classification Search
CPC .................. E04B 9/003; F16M 13/027; F16M 2200/024; H02G 3/123; H04R 1/021; F21V 21/04; F21S 8/02
See application file for complete search history.

(56) References Cited

U.S. PATENT DOCUMENTS

| | | | | |
|---|---|---|---|---|
| 3,518,420 A | * | 6/1970 | Kripp | F21S 8/02 |
| | | | | 362/365 |
| 3,872,296 A | * | 3/1975 | Cohen | F21V 17/164 |
| | | | | 248/343 |
| 4,048,491 A | | 9/1977 | Wessman | |
| 4,250,540 A | | 2/1981 | Kristofek | |
| 4,274,615 A | * | 6/1981 | Chan | F21V 21/04 |
| | | | | 362/365 |
| 4,293,895 A | | 10/1981 | Kristofek | |

(Continued)

*Primary Examiner* — Tan Le
(74) *Attorney, Agent, or Firm* — Kirk A. Buhler; Buhler & Associates Patenting

(57) ABSTRACT

Improvements in an access point through a wall or ceiling for gaining access through the wall or ceiling using only one side of the wall or ceiling. After cutting a home the housing or frame for can then be pushed into the opening for installation and the installer can compress one-way retaining arms to secure the frame without requiring the use of any additional tools or requiring access to the back of the wall, ceiling or floor. The frame has locating key(s) ensures that the cover or electronics is installed in the preferred rotational orientation. One or plurality of locating keys that ensures the internal electronics can be installed in one or more than one orientation to minimize confusion regarding an acceptable orientation. The rotation positions can also be used to ensure that a logo or internal feature or cover is properly oriented.

20 Claims, 5 Drawing Sheets

(56) References Cited

U.S. PATENT DOCUMENTS

| | | | |
|---|---|---|---|
| 4,431,151 A | 2/1984 | Schonasky | |
| 4,475,147 A * | 10/1984 | Kristofek | F21V 7/0025 |
| | | | 362/361 |
| 4,673,149 A | 6/1987 | Grote et al. | |
| 4,733,339 A | 3/1988 | Kelsall | |
| 4,739,460 A | 4/1988 | Kelsall | |
| 5,377,088 A | 12/1994 | Lecluze | |
| 5,609,414 A | 3/1997 | Caluori | |
| 5,941,625 A | 8/1999 | Morand | |
| 6,026,927 A | 2/2000 | Burdett et al. | |
| 6,070,694 A | 6/2000 | Burdett et al. | |
| 6,101,262 A | 8/2000 | Haase et al. | |
| 6,554,458 B1 | 4/2003 | Benghozi | |
| 6,827,471 B1 | 12/2004 | Benghozi | |
| 6,896,394 B2 | 5/2005 | Houle | |
| 7,178,628 B2 | 2/2007 | Gordon | |
| 7,399,104 B2 | 7/2008 | Rappaport | |
| 7,530,705 B2 | 5/2009 | Czech et al. | |
| 7,587,059 B2 | 9/2009 | Wright | |
| 7,654,705 B2 * | 2/2010 | Czech | F21S 8/02 |
| | | | 362/147 |
| 7,997,381 B2 | 8/2011 | Gordon | |
| 9,093,188 B1 | 7/2015 | Holland | |
| 9,261,129 B2 | 2/2016 | Herrema | |
| 9,591,390 B2 | 3/2017 | Humphreys et al. | |
| 9,926,708 B1 | 3/2018 | Janko | |
| 2004/0257818 A1 | 12/2004 | Benghozi | |
| 2005/0045171 A1 | 3/2005 | Wright | |
| 2005/0123156 A1 | 6/2005 | Wright | |
| 2007/0217207 A1 | 9/2007 | Caluori | |
| 2010/0040254 A1 | 2/2010 | Wright | |
| 2013/0057141 A1 | 3/2013 | Van De Ven et al. | |
| 2015/0010372 A1 | 1/2015 | Herrema | |
| 2016/0105738 A1 * | 4/2016 | Humphreys | H04R 1/021 |
| | | | 381/332 |

* cited by examiner

WALL OR CEILING ACCESS POINT

CROSS-REFERENCE TO RELATED APPLICATIONS

This application claims the benefit of Provisional Application Ser. No. 63/414,208 filed Oct. 7, 2022, the entire contents of which is hereby expressly incorporated by reference herein.

PRIOR ART

U.S. Pat. No. 9,591,390 issued on Mar. 7, 2017, to Tyler Humphreys et al., and is titled Fixture Housing for Recessed Speaker. This patent describes a fixture housing for recessed speaker or lighting that can be installed from one side of a wall or ceiling is disclosed. The fixture housing can then be pushed into the opening. The fixture housing for recessed speaker includes a plurality of engaging tabs that allows an installer to simply lift the speaker into the fixture housing for recessed speaker, and then turn the speaker within the fixture to lock the speaker within the fixture housing for recessed speaker. The securing tabs fold inward to clear the hole opening and then fold back out where the securing ears are brought down onto the back side of the opening to clamp the fixture to the wall or ceiling and secure the fixture. While this is for a fixture housing, the housing is for a speaker that blocks access through the opening and not for an access port.

U.S. Pat. No. 9,926,708 issued on Mar. 27, 2018, to Mikulas Janko and is titled Magnetic Fasteners and Wall Cover System. This patent describes a magnetic fastener and wall covering system including at least one wall panel having a front facing surface, a magnetically attractive rear facing surface and a side surface forming any number of different shapes. A plurality of wall fasteners and wall anchors are provided to penetrate and engage a wall. A plurality of magnetic spacers is provided having a central aperture for receiving one of the plurality of wall fasteners, and for attracting to the magnetically attractive rear surface of the wall panel. The system also includes one or more wall strips having a magnetic top surface and an adhesive back surface. While this patent describes a wall cover, the cover is retained by magnets that are secured to the wall and it does not provide structural support to the hole in the wall.

U.S. Pat. No. 8,422,722 issued on Apr. 16, 2013, to Ronald D. Maurer and is titled Audio Speaker Grille Mounting System. This patent discloses an audio speaker assembly is provided with a grille which twist locks with the speaker housing for assembly and disassembly. The housing includes a perimeter edge with a plurality of slots and tab retainers. The grille includes a perimeter edge with a plurality of tabs. The tabs of the grille align with the slots of the housing, and the grille is then rotated so that the tabs under lay the tab retainers to lock the grille into securement with the speaker housing. The grille is rotated in the opposite direction to unlock the grille for disassembly. While this patent discloses a speaker grille, the grille is retained only with plastic retaining tabs.

What is needed is an access point for a wall or ceiling that includes multiple securing mechanisms that allow the cover or grille to be quickly and easily installed, serviced, and removed. The proposed access point for a wall or ceiling provides the solution.

BACKGROUND OF THE INVENTION

The need for an access point or port through a wall, ceiling or floor can be found and used in many locations from homes and cars to businesses and venues. Nearly all access ports have a cover or grille that prevents accidental damage or access though the wall to prevent or reduce access to components therein. The access port needs to be constructed and installed through and over a surface to resist tampering and air movement. The access point must have a cover or grille can often be removed to servicing or access. The retention mechanism that holds the cover or grille onto the enclosure needs to allow the cover or grille to be quickly and easily located attached and removed without the use of additional tools. A number of patents and or publications have been made to address these issues. Exemplary examples of patents and or publication that try to address this/these problem(s) are identified and discussed herein.

SUMMARY OF THE INVENTION

It is an object of the access point for a wall or ceiling to have a plurality of magnets that provide attraction to an outer cover. The magnets provide an initial attraction that holds the cover or grille in location. This is particularly useful when the cover or grille is being installed in ceiling installations and on vertical surfaces where gravity can allow the cover or grille to fall. The magnets further prevent vibration or movement.

It is an object of the access point for a wall or ceiling to be installed from one side of a wall or ceiling. Installing the fixture housing from just one side of a wall allows an installer to install the fixture within a finished house or building. This significantly increases the ability of the installer to place the fixture in a location that provides the best sound quality as opposed to using a location that provides the best access for the structure of the house and stud/joist locations.

It is an object of the access point for a wall or ceiling to have a locating key. The locating key(s) ensures that the speaker grille is installed in the preferred rotational orientation. There can be one or plurality of locating keys that ensures the internal electronics can be installed in one or more than one orientation like 45-degree, 90-degree, 120-degree or 180-degree rotation options to minimize confusion regarding an acceptable orientation. The rotation positions can also be used to ensure that a logo or internal feature or cover is properly oriented.

It is another object of the access point for a wall or ceiling to have a plurality of locking tabs. The locking tabs require the installer to push the electronics completely into the housing and rotate the components within the locking tabs. The locking tabs are placed at various locations around a ring of the electronics to provide a minimum of three retention locations, so the cover or grille sits flat within the housing.

It is another object of the access point for a wall or ceiling to provide for quick installation that requires just a circular hole saw. An installer can use a stud finder to identify where the stud is located to ensure that the mounting hole is not cut through a stud or joist that is not visible from the installation wall. Once the ideal location is identified the installer uses a standard recessed lighting hole saw to cut an opening in the desired location. The installation of the housing for can then be pushed into the opening for installation and compress one-way retaining arms to secure the frame without requiring the use of any additional tools or requiring access to the back of the wall, ceiling, or floor.

It is another object of the access point for a wall or ceiling to have a reduced weight. The reduced weight was accomplished by using polymers. The polymers are not sensitive to ultraviolet light, had good flexibility, and maintained their shape under a wide variety of temperatures.

It is another object of the access point for a wall or ceiling to be easily installed and removed multiple times without compromising the structural integrity of mounting. The elastomeric nature of the grille edge when combined with the correct durometer polymer allowed for the cover or grille and internal electronics to be removable without damaging or deforming the perforated material, and at the same time gripping the foundation bezel without easily falling off.

It is another object of the access point for a wall or ceiling to have a plurality of retention spring arms. In addition to the locking tabs previously described some or all of the locking tabs can include retention spring arms. Because plastics can soften and run, particularly in hot environments the speaker grille has a plurality of metal retention spring arms. The spring arms retain the electronics in the desired location on the housing. The spring arms also provide additional flexibility and travel for retention.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
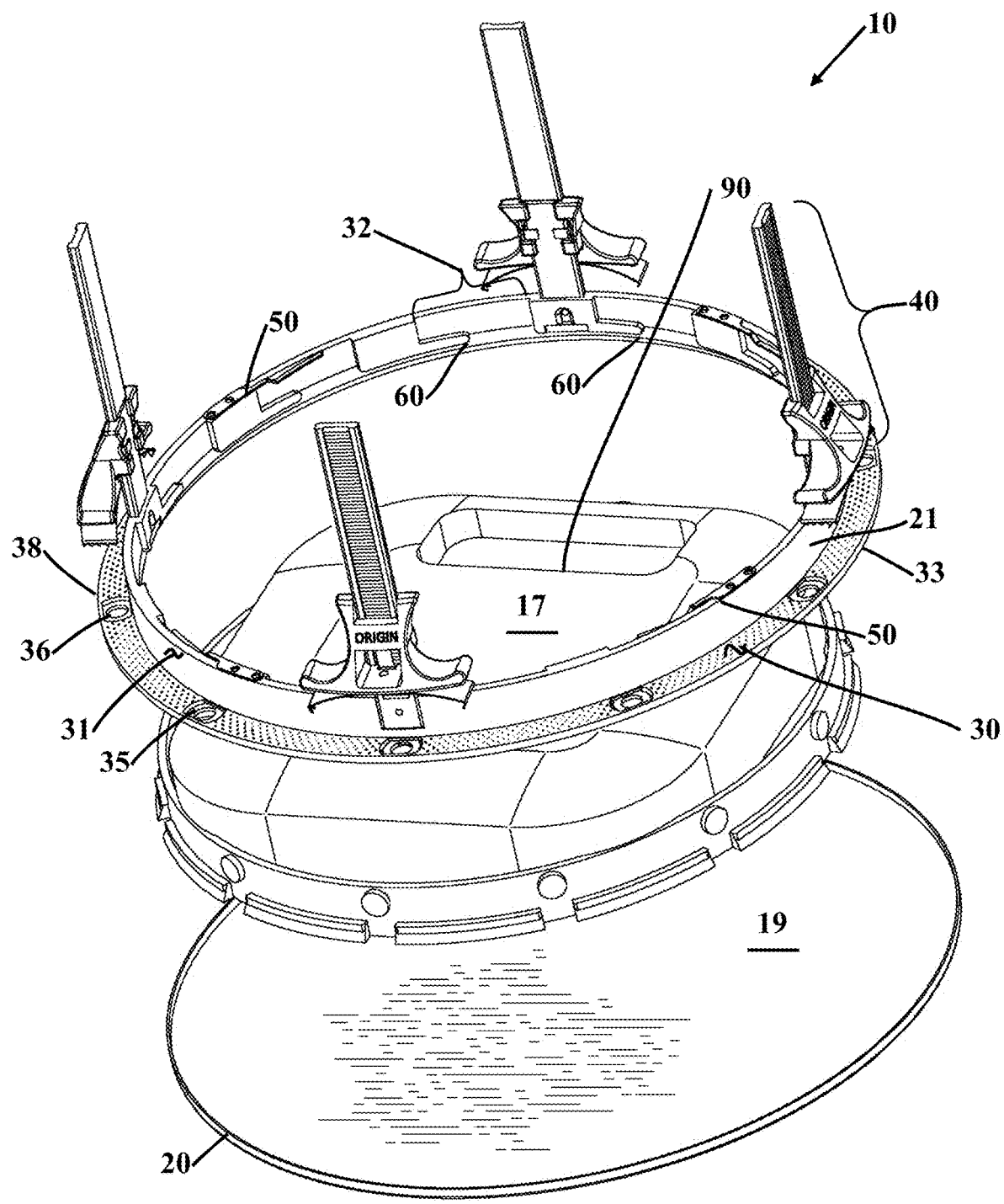
FIG. 1 shows an inside wall view of a complete access point for a wall or ceiling.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

| Item Numbers and Description | |
|---|---|
| 10 access point for a wall or ceiling | 17 baffle |
| 18 inside face | 19 cover or grill |
| 20 outer rim | 21 bayonet ring |
| 22 boss | 23 indicia |
| 24 handle | 25 clearance |
| 30 cushion | 31 wall |
| 32 key openings | 33 flange |
| 34 face | 35 magnet cover |
| 36 magnet | 37 magnet pocket |
| 38 outer rim | 39 fastener |
| 40 zip dog assembly(s) | 41 zip rail |
| 42 inner side | 43 outer side |
| 44 foot | 45 hole |
| 50 retention spring arm | 51 retainer(s) |
| 52 bend | 54 ramp area |
| 57 spring foot | 60 locking tab |
| 61 tip | 62 open area |
| 63 ledge | 64 stop |
| 65 wall | 70 handle |
| 71 finger or grip well(s) | 72 flex body |
| 73 teeth | 74 head |
| 79 fastener | 90 connections |
| 91 wall or ceiling | 96 flex |
| 97 down | 98 rotated |
| 99 rotate | |

FIG. 1 shows an inside wall view of a complete access point for a wall or ceiling 10. The access point for a wall or ceiling 10 has an outer cover or grille 19 that is made from a solid material that can be painted to match the existing wall or ceiling, but the cover or grill can be fabric, cloth or wire mesh that is stretched across a frame. The cover or grill 19 is temporally retained on the outer rim 20 of the bayonet ring 21. The access point for a wall or ceiling 10 is shown has round shape that allows the baffle 17 to be rotated and locked (or unlocked) in the bayonet ring 21 to retain the baffle 17. The frame of the bayonet ring 21 has an outer rim 38 flange 33 that is shown covered by a cushion 30 but could also be textured to "grip" the outer surface of the wall or ceiling.

The cushion 30 or a friction cushion that accommodates variation in manufacturing and wall or ceiling texture. The cushion 30 also eliminates vibration and reduces any unwanted movement. The flat outer rim 38 of the bayonet ring 21 has a low-profile thickness of 2 mm or less. The speaker grille 10 can be installed and removed multiple times without compromising the structural integrity of the speaker grille 10. The flange further has a plurality of magnets that are located under the magnet covers 35. The magnets provide an attraction to hold the cover or grille 19 in location.

The outer rim 38 flange 33 joins to a wall 31 that rises from the flange and extends into the housing, wall or ceiling. The inside of wall 31 has a plurality of features to assist in retaining baffle 17. The baffle may simply block access through the central opening of the bayonet ring 21 but could be a speaker or connection 90 for a wireless access point or a network device. A number of key openings 32 are located around the inside of wall 31. The key openings 32 allow for alignment and ensure that the baffle 17 is in a position for rotation to lock the baffle 17 in the bayonet ring 21 housing.

The majority of the cover or grill 19 is made from a polymer that provides light weight. The plastic has an expansion and contraction rate like that of the foundation speaker to which it was attached. The durometer of the plastic is between 20 and 90, a more preferred durometer of between 50 and 70. A raised outer rim 20 surrounds the cover or grill to form a flange. The cover or grill 19 can fit onto the bayonet ring 21 with an interference fit or can be magnetically attracted if magnets 36 are used and optionally covered with magnet covers 36.

There are a number of molded locking tabs 60 that retain the baffle 17. In addition to the locking tabs 60 there are multiple retention spring arms 50 that are compliant to accommodate vibration and variation. While a round shape is shown and described other shapes including, but not limited to, rectangles, squares, ovals, and irregular shapes are contemplated. The different features and functions are shown and described in other figures herein in greater detail as the features are shown in enlarged figures herein.

Figure 2:
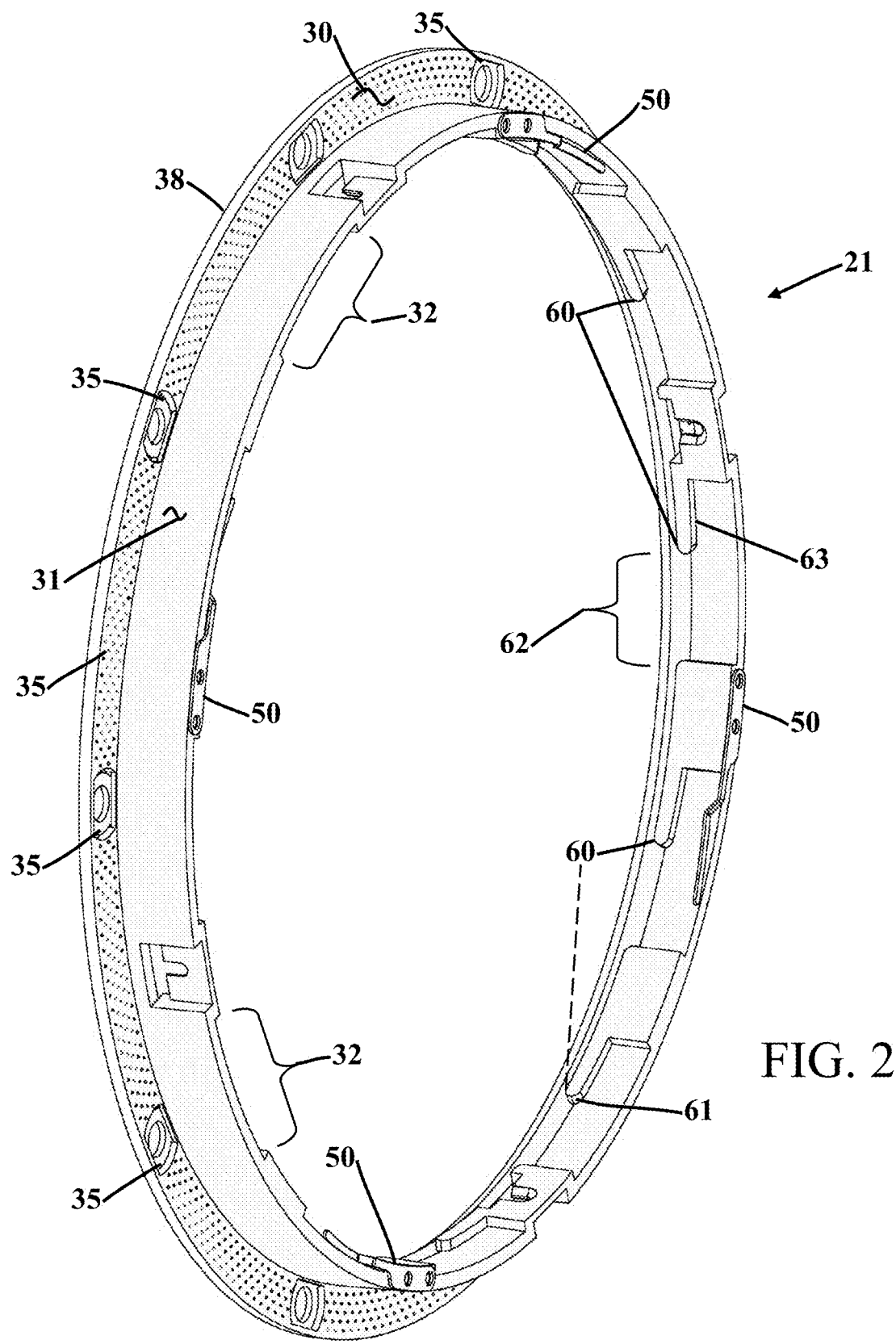
FIG. 2 shows a detailed view of the bayonet ring with zip dogs removed.
Figure 3:
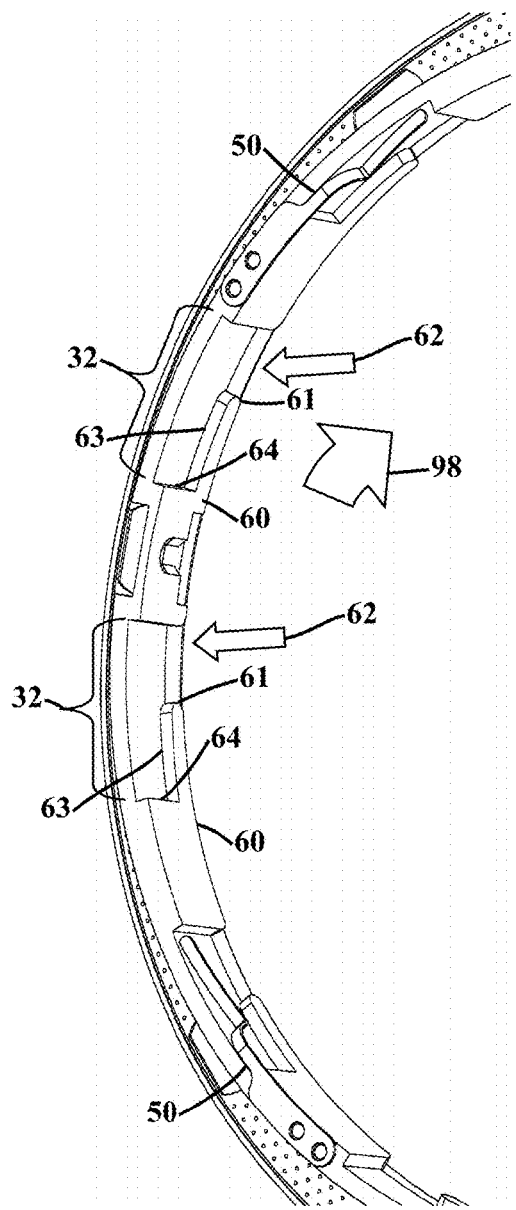
FIG. 3 shows a detailed view of the key and locking tab.
Figure 4:
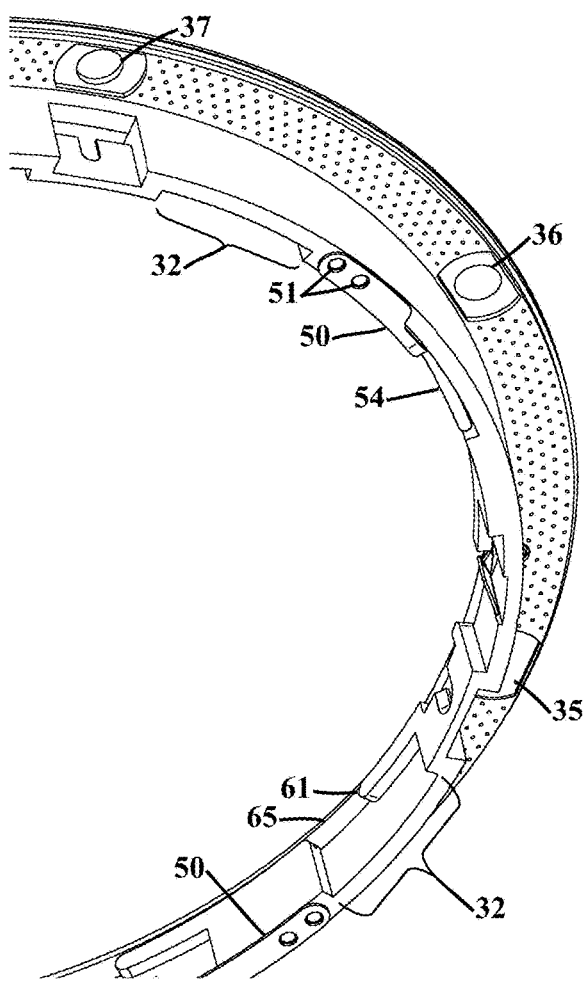
FIG. 4 shows a detailed view of the locking tab and the retention spring arm.

FIG. 2 shows a detailed view of the bayonet ring 21 with zip dogs removed, FIG. 3 shows a detailed view of the key and locking tab and FIG. 4 shows a detail view of the locking tab and the retention spring arm.

The key 32 openings 32 are associated with locking tabs 60. The key 32 allows the bayonet ring 21 to pass over complementary features of the baffle, not shown. When the baffle is clocked into the key 32 slots in the bayonet ring 31 it creates an opening for the tip 61 to pass into the open area 62 so the ledge 63 of the locking tab can be moved into. As the speaker grille is rotated 98, the rotation moves the tip 61 of the locking tab 60 into a complementary tab in the speaker, housing, or frame. A stop 64 in the locking tab 60 prevents over-rotation of the speaker grille.

The speaker frame is predominantly made from a plastic material that can creep over time. This figure also shows retention spring arm(s) 50 that provides additional retention that compensates for creep of the plastic speaker grille material to prevent vibration. The description and function of the spring arm(s) is shown and described in other figures herein.

As a reference the key 32 openings are shown within the arc of the speaker grille. Tip 61 of the locking tab(s) 60 can also be seen. There is wall 65 near tip 61 of the locking tab that prevents the speaker grille from being over-inserted onto a housing. Near the locking tab(s) the retention spring arm(s) 50 can be seen.

From FIGS. 3 and 4, the retention spring arms 50 have a straight portion for securing the baffle (not shown) with retainers 51. The retainers 51 can be fasteners or the retention spring arms 50 can be thermally staked onto the speaker grille frame. The retention spring arms 50 have a bend a spring area and a ramp area 54 that allows the retention spring arm 50 to ramp over a tab in the baffle (not shown). Retention spring arm 50 retains an even pressure to hold the baffle in position within the bayonet ring 21.

These figures also show the magnet cover 35 and in one position the magnet cover has been removed to show an optional magnet 36. In another location both the magnet cover and the magnet have been removed to show a magnet pocket 37 within a recess where the magnet cover would be located. It is contemplated that as few as two magnets can be used, but more than two magnets are used and, in this embodiment, there is a total of 8 magnets 36 with eight magnet covers 35. The magnet covers 35 are ferric material that distributes the magnetic force. There is a complementary ferrous material or magnet in the opposing enclosure, or housing (not shown).

Figures 5, 6:
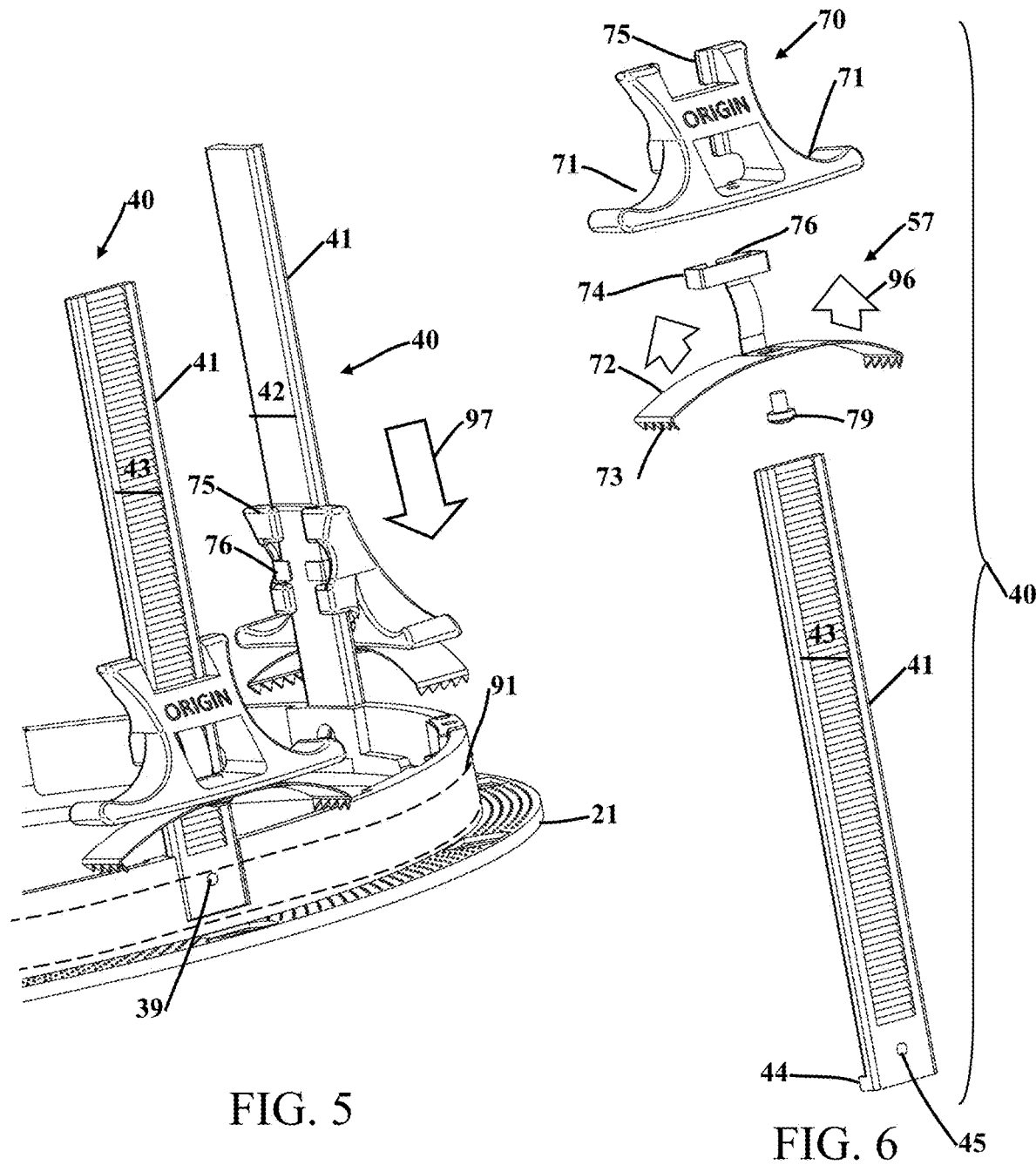
FIG. 5 shows the bayonet ring with the zip dogs.
FIG. 6 shows and exploded view of a zip dog.

FIG. 5 shows the bayonet ring 21 with the two-zip dog(s) 40 assemblies and FIG. 6 shows and exploded view of a zip dog assembly 40. A portion of the bayonet ring 21 is shown with two of the four zip dog assemblies 40. The zip dog assemblies 40 are shown extending from bayonet ring 21 where the zip dog assemblies 40 are secured with a fastener 39 that passes from inside of the bayonet ring 21 and into a hole 45 in the zip rail 41. A foot at the bottom of the zip rail 41 further locates and secures the zip rail 41 with the bayonet ring 21. Each zip rail 41 arm has a smooth inner side 42 that faces into the center of the bayonet ring 21 and an opposing toothed outer side 43 that faces away from the center of the bayonet ring 21. While the toothed outer side 43 is shown on the outer surface it is contemplated that the toothed surface can be on the inside or on both sides. The profile of the toothed surface can be variety of shapes including but not limited to saw tooth, triangular, Acme, sine wave or other shape that has positive locking potential.

Each zip dog 40 has a double-sided handle 70. In the preferred embodiment, the zip rail(s) 41 and the double-sided handle(s) 70 are interchangeable but could also be keyed or shaped to connect in only a specific location. The zip rail 41 is configured to pass through handle 70. All of the zip arms(s) 40 arms are essentially the same as they extend from the vertical wall of the bayonet ring 21. The bottom of the handle 70 has a spring foot 57 that bends to maintain clamping pressure. The handle 70 and the spring foot are assembly by inserting the head 74 of the spring foot 57 into the handle 70. A fastener 79 secures the spring foot 57 into the handle 70. The arms 76 of the spring foot 57 and the arms 75 of the handle 70 extend around the smooth inner side 42 of the zip rail 41.

After the access point for a wall or ceiling has been placed through a wall, ceiling or door opening, the user, or installer will place their finger in the finger or grip well(s) 71 and pull down 97 the handle 70 with the spring foot to force the spring foot 57 onto the inside of the wall or ceiling 91. The teeth 73 at the downward facing ends of the spring foot 57 flex 96 on the flex body 72 and grip into the inside of the wall or ceiling 91 to secure the bayonet ring 21 and prevent rotation of the bayonet ring 21 when the baffle is being installed and removed.

Figure 7:
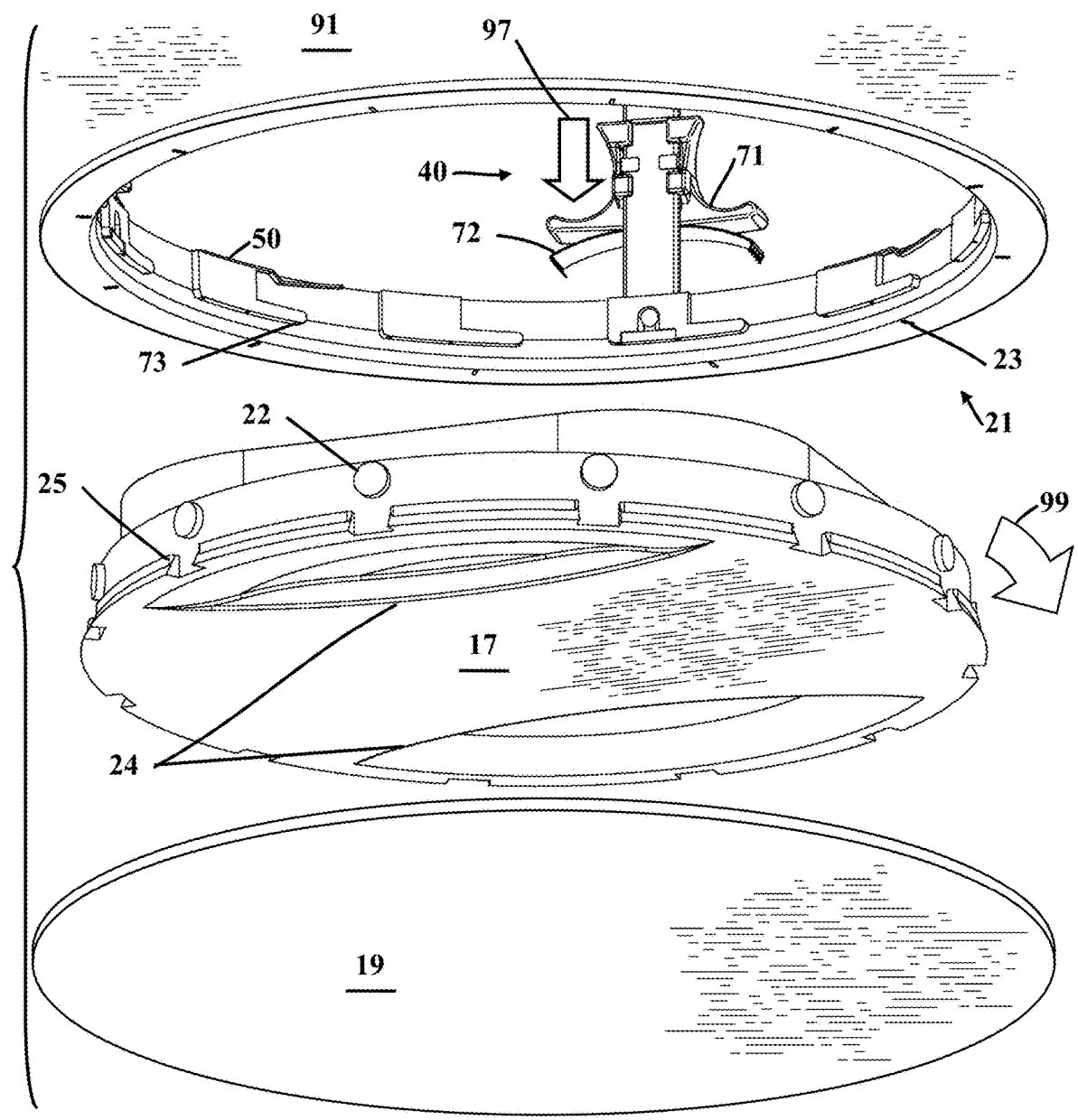
FIG. 7 shows the baffle being inserted and locking into the bayonet ring that is installed in a ceiling.

FIG. 7 shows baffle 17 being inserted and locking into bayonet ring 21 that is installed in a wall or ceiling 91. This view is from a user perspective inside of a building or house and looking at the wall or ceiling 91. Bayonet ring 21 has been inserted into the hole in the wall or ceiling 91. From this figure, at least one of the zip dogs 40 has not been seated against the inner surface of the wall or ceiling 91. To complete securing the zip dog 40, a user will place fingers (or a tool) in the finger wells 71 and pull the handle down 97 towards the inside of the wall or ceiling 91 so the flex body 72 locks the zip dog in position where a tooth in the handle or flex body grips a tooth on the first side, inner side of the zip rail 41. The flex body is constructed from formed sheet metal with a first side having a head 74 with arms 76 that are formed to fit around the flexible retention spring arms 41 and a second side formed as an arched spring having the gripping teeth 73. The spring foot 57 is configured to fit within the handle 70 and be retained with the fastener 79 as shown in FIG. 6.

Through the portion of the bayonet ring 21 shown in this figure, the teeth 73 and retaining spring arm(s) 50 are shown. The boss(s) 22 on the outer circumference of the baffle 17 engage into and over the teeth 73 and when the baffle 17 is rotated 99 the baffle 17 will be secured and prevented from free rotation by the retention spring arm(s) 50. The baffle 17 may simply block access through the central opening of the bayonet ring 21, could be a speaker or connections for a wireless access point or a network device. The baffle 17 is shown with handles 24 or other features to allow for gripping and rotating the baffle 17. There is a clearance 25 feature in the face of the baffle 17 that aligns with the boss(es) 22. Indicia 23 is shown in the underside of the bayonet ring 21 that identifies the location of the engaging tabs to position the rotation of the baffle 17 relative to the bayonet ring 21 for easier orientation when installing the baffle 17.

This figure shows an outer cover or grille 19 that is made from a solid material that can be painted to match the existing wall or ceiling, but the cover or grill can be fabric, cloth or wire mesh that is stretched across a frame. The cover or grill 19 is temporally retained on the outer rim of the bayonet ring 21. Interference fit or magnets may be used to secure the cover or grill 19 to the bayonet ring 21 as previously described.

Thus, specific embodiments of an access point for a wall or ceiling have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An access point for a wall or ceiling comprising:
   a bayonet ring with a flange;
   said bayonet ring having an inner ring that is sized to fit within a circular hole in sheetrock or drywall and said bayonet ring having at least one locating key opening;
   said bayonet ring having at least three flexible retention spring arms;
   said at least three flexible retention spring arms are configured to independently flex on said bayonet ring to retain a baffle;
   said bayonet ring further having at least two arms that are configured to flex and pass through said circular hole and retain said bayonet ring to said sheetrock or said drywall between at least two arms and said flange,
   each said at least two arms have a retainer with a handle and a flex body with teeth on one side of each of said flex body and are smooth on the opposing side of said flex body, and
   said baffle is configured to engage in locking tabs in said bayonet ring.

2. The access point for a wall or ceiling according to claim 1, wherein said at least two arms are located on an outer rim of the bayonet ring and prevents rotation and removal of said bayonet ring.

3. The access point for a wall or ceiling according to claim 1, wherein said flex body with teeth is individually releasable from each of said at least two arms.

4. The access point for a wall or ceiling according to claim 1, wherein each of said at least three flexible retention spring arms is individually adjustable on each of said at least two arms and a handle body that extends from opposing sides over each of said at least two arms.

5. The access point for a wall or ceiling according to claim 1, wherein said at least two arms is at least three flat arms.

6. The access point for a wall or ceiling according to claim 1, wherein said at least two arms is at least four flat arms.

7. The access point for a wall or ceiling according to claim 1, further includes a retention mechanism for retaining a cover or a grill.

8. The access point for a wall or ceiling according to claim 7, wherein said retention mechanism is at least one magnet.

9. The access point for a wall or ceiling according to claim 1, further includes a retention mechanism for retaining said baffle comprising of a plurality of locking tabs whereby said retention mechanism is sized to fit through an inside of said bayonet ring, into an inner vertical wall of said bayonet ring.

10. The access point for a wall or ceiling according to claim 9, wherein said plurality of locking tabs extend from said inner vertical wall into said circular hole.

11. The access point for a wall or ceiling according to claim 10, wherein said baffle is rotated in said bayonet ring to engage said retention mechanism to retain said baffle in said bayonet ring.

12. The access point for a wall or ceiling according to claim 11, wherein said baffle has at least one handle or recess that is configured to grasp and rotate said baffle in said bayonet ring.

13. The access point for a wall or ceiling according to claim 1, wherein said at least two arms each has at least one zip rail side.

14. The access point for a wall or ceiling according to claim 1, wherein said flange has a friction cushion.

15. The access point for a wall or ceiling according to claim 1, wherein said flex body is constructed from formed sheet metal.

16. The access point for a wall or ceiling according to claim 15, wherein said formed sheet metal has a first side having a head with arms that are formed to fit around said flexible retention spring arms.

17. The access point for a wall or ceiling according to claim 16, wherein said formed sheet metal has a second side formed as an arched spring.

18. The access point for a wall or ceiling according to claim 15, wherein said formed sheet metal is configured to fit within said retainer.

19. The access point for a wall or ceiling according to claim 1, wherein said baffle has a plurality of bosses on an external wall of said baffle that are configured to engage said at least three flexible retention spring arms to retain a baffle in said bayonet ring.

20. An access point for a wall or ceiling comprising:
    a bayonet ring with a flange;
    said bayonet ring having an inner ring that is sized to fit within a circular hole in sheetrock or drywall and said bayonet ring having at least one locating key opening;
    said bayonet ring having at least three flexible retention spring arms;
    said at least three flexible retention spring arms are configured to independently flex on said bayonet ring to retain a baffle;
    said bayonet ring further having at least two arms that are configured to flex and pass through said circular hole and retain said bayonet ring to said sheetrock or said drywall between at least two arms and said flange,
    said at least two arms are constructed from formed sheet metal that has a first side having a head with arms that are formed to fit around said flexible retention spring arms, and
    said baffle is configured to engage in locking tabs in said bayonet ring.

* * * * *